J. MAZUEL.
STOP COCK FOR MOTOR VEHICLES.
APPLICATION FILED FEB. 3, 1913.

1,075,429.

Patented Oct. 14, 1913.

UNITED STATES PATENT OFFICE.

JEAN MAZUEL, OF PARIS, FRANCE.

STOP-COCK FOR MOTOR-VEHICLES.

1,075,429.

Specification of Letters Patent.    Patented Oct. 14, 1913.

Application filed February 3, 1913. Serial No. 746,056.

*To all whom it may concern:*

Be it known that I, JEAN MAZUEL, citizen of the French Republic, residing at 81 Rue St. Dominique, Paris, France, have invented new and useful Improvements in Stop-Cocks for Motor-Vehicles, of which the following is a specification.

This invention has for its object to provide an improved stop cock for controlling the supply of liquid fuel to the motor of a motor vehicle, with or without an interposed carbureter.

The improved stop cock comprises a plurality of cock plugs located side by side in a unitary member or cock-casing in such a manner that the bore of the cock can be opened only by a person knowing the combination, and only by turning each one of the separate cock-plugs to the one particular position which alone permits free passage through that particular plug. The improved cock thus constitutes a safety device for preventing the motor from being started by any person except the driver.

The improved cock is very simple in construction, and can be easily arranged in the petrol supply pipe (in front of the carbureter where such is provided); it allows of conveniently and rapidly changing the combination, and it thus provides an effectual means for preventing the theft of motor vehicles.

The bore of the improved cock, that is to say the passage between the inlet and outlet orifices of the cock casing, is made of zigzag shape having the peculiarity that each cock plug contains a substantially Z-shaped portion of said bore. This arrangement of the cock bore not only prevents the improper insertion of a metal rod for the purpose of ascertaining by feeling, when the cock is open, but it also allows of the cock plugs being rotated a complete turn in order to return them to their open positions. This complete rotation allows of surmounting the cock plugs with numbered or lettered rings or disks graduated over their entire circumference. These disks or rings are designed to form a number or word which when this is done, effects the opening of the cock. This number or word which may be changed by the owner or the holder of the safety cock, will then appear, for instance on the side of the carbureter of a motor vehicle.

This invention is illustrated in the accompanying drawings which show by way of example a convenient construction of the improved safety cock capable of being set to a number of different combinations at will.

Figure 1:
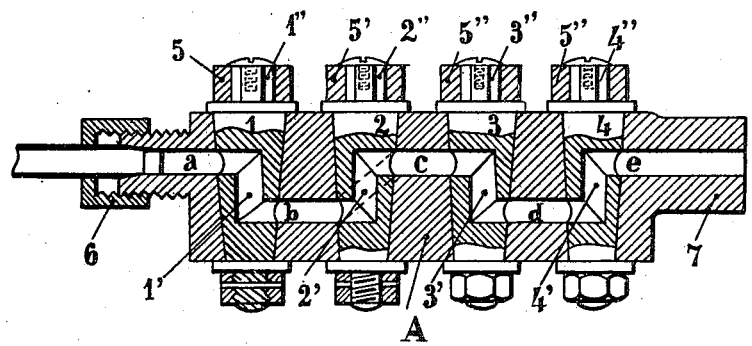
Figure 2:
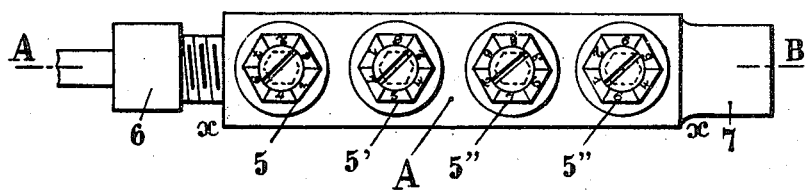
Figure 3:
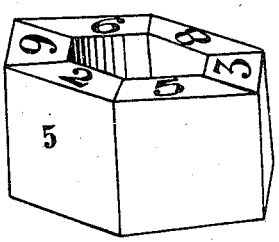

In these drawings:—Figure 1 is a longitudinal section of the improved cock when open. Fig. 2 is a plan thereof. Fig. 3 is a perspective view of one of the numbered blocks used in carrying out this invention.

As shown the improved cock comprises a rectilinear member or casing A in which are fitted so as to be capable of rotation a plurality of non-contiguous cock plugs 1, 2, 3, 4 which lie side-by-side in alinement and are held in place in the usual manner. The cock bore is formed partly in the cock casing and partly in the several cock plugs, and has the shape of a broken or zig-zag line $a$ $1'$, $b$, $2'$, $c$, $3'$, $d$, $4'$, $e$, whereof the portions $1'$, $2'$, $3'$, $4'$, belong respectively to the cock plugs 1, 2, 3, 4, and are substantially of Z-shape or as shown in dotted lines, so that each cock plug can be turned through a complete revolution from its open position in order to return into said open position. Each of said cock plugs has at its upper part a head $1''$, $2''$, $3''$, $4''$ of square or polygonal section upon which are respectively threaded or fitted nut-like blocks 5, $5'$, $5''$, $5'''$ of more or less prismatic shape. The top face of each block is divided into (for instance six) panels each having a numeral, letter, color or any other suitable mark or sign in a suitable order of succession. These blocks are held in position by means of screws screwing into the heads of the cock plugs or in any other suitable manner.

In setting each block 5, etc., in position it is an easy matter to bring any desired one of its numerals, letters, color or signs opposite the line X—X of the cock casing (Fig. 2) which is used as a datum line. This setting of the blocks is done when all the cock plugs are in their open positions (Fig. 1), and the number constituted by the series of numerals thereby made to face the datum line X—X is the number which must be reproduced in order to open the cock to allow a supply of the liquid fuel to pass through the cock.

When the driver leaves his vehicle, he need only rotate one or more of the several cock plugs to a greater or less extent in order to shut off the supply of fuel and also jumble up the number to which the whole series of cock plugs must be set in order to restore the supply of fuel. Under these conditions no person other than the driver can reopen the cock except by very protracted trials.

It is in the power of the driver to change the combination number for opening the cock as many times as he likes in the course of the day. For this purpose he has merely to dismount the number blocks and to change their order in the series. Further, the construction of the bore $a$, $b$, $c$, $d$, $e$ in a broken or zig-zag line increases the security by preventing the insertion of a metal wire which might be employed for the purpose of ascertaining more or less quickly the open positions of the plugs.

The improved cock may be made of any form and size and with any number of plugs. It may be provided on one side with a screw connector 6 for connection to the liquid fuel supply pipe, and on the other side with a neck 7 for mounting on the carbureter. The connector 6 may contain a wire gauze strainer for keeping out any impurities that might otherwise choke the bore of the cock.

In a modification the improved cock may comprise only the plugs 2, 3 and 4, the plug 1 being omitted, and its portion 1' of the bore being made to continue directly into the cock casing A. This modification while cheapening the manufacture does not lessen the degree of security of the improved cock.

What I claim is:—

1. In a stop cock, the combination with a unitary cock casing, of a plurality of non-contiguous cock plugs, a common bore controlled by said cock plugs, a common datum on the cock casing, and a plurality of signs on each of said cock plugs of which one sign is selected by its relation to said datum to denote the open position of its cock plug said signs constituting a series combination which can be broken up by rotating said cock plugs out of their open positions whereby in order to open said cock it is necessary to rotate each of said cock plugs into a position in which the series of signs on said cock plugs reproduce in their relation to said datum the combination which denotes that all the cock plugs and therefore the stop cock is open.

2. In a stop cock, the combination with a unitary cock casing, of a plurality of non-contiguous cock plugs, a common bore controlled by said cock plugs, a common datum on the cock casing, a member revolubly adjustable on the projecting end of each of said cock plugs and bearing a plurality of characters, and means for fixing each of said members in the position on its cock plug in which any selected character on that particular member denotes in its relation to said common datum that its cock plug is open.

3. In a stop cock, the combination with a unitary and longitudinally-extending cock casing of a plurality of non-contiguous cock plugs and a common bore composed of Z-shaped portions in said cock plugs and straight portions in the cock casing, a common datum line on the cock casing, a member revolubly adjustable on the projecting end of each of said cock plugs and bearing a plurality of characters, and means for fixing each of said members in the position on its cock plug in which any selected character on said member denotes in its relation to said common datum that its cock plug is open, the Z-shaped portions of the common bore preventing the insertion of a wire through same for the purpose of ascertaining the open positions of said cock plugs.

4. A combination stop-cock, consisting of a unitary member having a continuous passageway extending longitudinally therethrough and having also a plurality of transverse valve-seats intersecting said passageway, and a rotary plug-valve fitted into each seat and having a stem at its outer end and having also a transverse opening adapted to register with said passageway, and a radially-adjustable block secured upon each stem and presenting a plurality of characters or symbols, the correspondingly-located characters or symbols on the respective blocks being in a straight line.

In testimony whereof I have signed my name to this specification in the presence of two subscribing witnesses.

JEAN MAZUEL.

Witnesses:
LEON CRAMBLEN,
HANSON C. COXE.

---

Copies of this patent may be obtained for five cents each, by addressing the "Commissioner of Patents, Washington, D. C."